US008422198B2

(12) United States Patent
Lee et al.

(10) Patent No.: US 8,422,198 B2
(45) Date of Patent: Apr. 16, 2013

(54) ELECTRIC DOUBLE LAYER CAPACITOR PACKAGE AND METHOD OF MANUFACTURING THE SAME

(75) Inventors: Sang Kyun Lee, Gyunggi-do (KR); Jung Eun Noh, Gyunggi-do (KR); Bae Kyun Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 262 days.

(21) Appl. No.: 12/926,107

(22) Filed: Oct. 26, 2010

(65) Prior Publication Data
US 2011/0286149 A1    Nov. 24, 2011

(30) Foreign Application Priority Data

May 20, 2010    (KR) .................. 10-2010-0047519

(51) Int. Cl.
*H01G 9/00*    (2006.01)

(52) U.S. Cl.
USPC ........... 361/502; 361/503; 361/504; 361/512; 361/523; 361/528

(58) Field of Classification Search ............ 361/502, 361/503–504, 509–512, 516–519, 523–525, 361/528–529, 303–305
See application file for complete search history.

(56) References Cited

U.S. PATENT DOCUMENTS

| 5,260,855 | A | * | 11/1993 | Kaschmitter et al. | ......... | 361/502 |
| 6,493,209 | B1 | * | 12/2002 | Kamath et al. | ................ | 361/502 |
| 6,625,007 | B2 | * | 9/2003 | Sakata et al. | .................. | 361/502 |
| 6,657,850 | B2 | * | 12/2003 | Nakazawa et al. | ............ | 361/502 |
| 6,762,926 | B1 | * | 7/2004 | Shiue et al. | .................... | 361/502 |
| 2006/0087795 | A1 | | 4/2006 | Nagasawa et al. | | |

FOREIGN PATENT DOCUMENTS

| JP | 2003-59783 | 2/2003 |
| JP | 2004-327887 | 11/2004 |
| JP | 2004-100295 | 4/2006 |
| JP | 2006-128247 | 5/2006 |
| JP | 2006-287174 | 10/2006 |
| JP | 2008-186945 | 8/2008 |

OTHER PUBLICATIONS

Korean Office Action issued Jul. 1, 2011 in corresponding Korean Patent Application 10-2010-0047519.

* cited by examiner

*Primary Examiner* — Nguyen T Ha

(57) ABSTRACT

There is provided an electric double layer capacitor package and a method of manufacturing the same. The electric double layer capacitor package includes an exterior case formed of insulating resin and having therein one or more partitions providing a plurality of housing spaces; a plurality of capacitor cells disposed in the plurality of housing spaces, respectively, each capacitor cell including first and second electrodes and a separator interposed between the first and second electrodes; and an internal series-connection terminal buried in each of the partitions and connecting the plurality of capacitor cells in series.

19 Claims, 4 Drawing Sheets

ELECTRIC DOUBLE LAYER CAPACITOR PACKAGE AND METHOD OF MANUFACTURING THE SAME

CROSS-REFERENCE TO RELATED APPLICATIONS

This application claims the priority of Korean Patent Application No. 10-2010-0047519 filed on May 20, 2010, in the Korean Intellectual Property Office, the disclosure of which is incorporated herein by reference.

BACKGROUND OF THE INVENTION

1. Field of the Invention

The present invention relates to an electric double layer capacitor package and a method of manufacturing the same, and more particularly, to an electric double layer capacitor package allowing for an increase in a surge voltage and an operating voltage and a method of manufacturing the same.

2. Description of the Related Art

An electric double layer capacitor (EDLC) is an energy storage medium in which two electrodes of an anode and a cathode are arranged to face each other with a separator interposed therebetween so that a pair of charge layers (electric double layers) having different signs can be generated on the facing surfaces of the electrodes.

An EDLC is mainly used as an auxiliary power supply, an IC backup power supply or the like for a variety of electrical and electronic devices. In recent years, the EDLC has been widely used for applications including a toy, an industrial power supply, an uninterrupted power supply (UPS), solar energy storage, HEV/EV sub power, and the like.

An EDLC is generally manufactured by accommodating a unit cell in a case and then filling the case with an electrolyte. Here, the unit cell is constructed by stacking a pair of electrodes and a separator.

A pair of electrodes have a positive polarity (+) or a negative polarity (−) determined according to the sign of external electricity applied thereto. Terminals to which external electricity are applied are drawn from the pair of electrodes.

In the pair of electrodes, positive (+) charges and negative (−) charges are polarized, and accordingly, two charge layers (electric double layers) are formed in a single unit cell.

In a conventional unit cell, however, a surge voltage is low, i.e., less than 3.0V, and an operating voltage is also low, i.e., 2.3V to 2.7V. Therefore, there is a problem in that two or more EDLCs have to be connected in series in order to establish an operating voltage applicable to electronic products.

However, in a case where two or more EDLCs are serially connected to increase the operating voltage, there is another problem in that a balance problem between the EDLCs, which inevitably occurs, should be solved. Specifically, there is a need for a voltage balance protection circuit such as a resistor, a diode and another IC so that the overall operating voltage of the capacitors is not concentrated on a single EDLC, in consideration of the capacitance of each EDLC, equivalent serial resistance (ESR), a leakage current, and the like.

However, since voltage balance among the EDLCs is broken due to repeated cycles, there is a problem that a high voltage is applied to anyone of the EDLCs. This causes an electrolyte to be dissolved (the electrolyte is dissolved when a voltage of 3.0V or more is applied thereto). It also results in increased internal resistance, reduced capacitance, and the like.

SUMMARY OF THE INVENTION

An aspect of the present invention provides an electric double layer capacitor package allowing for an increase in a surge voltage and an operating voltage and a method of manufacturing the same.

According to an aspect of the present invention, there is provided a electric double layer capacitor package including: an exterior case formed of insulating resin and having therein one or more partitions providing a plurality of housing spaces; a plurality of capacitor cells disposed in the plurality of housing spaces, respectively, each capacitor cell including first and second electrodes and a separator interposed between the first and second electrodes; and an internal series-connection terminal buried in each of the partitions and connecting the plurality of capacitor cells in series.

The internal series-connection terminal may be buried in each of the partitions by insert injection molding.

The internal series-connection terminal may be buried in a partition providing adjacent first and second housing spaces among the plurality of housing spaces. The internal series-connection terminal may have a first internal terminal portion exposed to the first housing space and a second internal terminal portion exposed to the second housing space.

The exterior case may have first and second external terminals so as to apply electricity to the capacitor cells.

The first and second external terminals may be buried in the exterior case, each external terminal having a first surface exposed to the housing space and a second surface exposed to an outside of the exterior case.

The first and second external terminals may be buried in the exterior case by insert injection molding.

The first and second external terminals may be provided on a surface to be defined as a lower surface of the exterior case.

A first electrode of a first capacitor cell among the plurality of capacitor cells may be electrically connected to the first external terminal connected to an external power source. A second electrode of a second capacitor cell among the plurality of capacitor cells may be electrically connected to the second external terminal connected to an external power source. A second electrode of the first capacitor cell and a first electrode of the second capacitor cell may be connected in series by the internal series-connection terminal.

The capacitor cell may include first and second current collectors electrically connected to the first and second electrodes.

The exterior case may include a lower case having the one or more partitions providing the plurality of housing spaces whose top surfaces are open, and an upper cap mounted on the lower case so as to cover the housing spaces.

According to another aspect of the present invention, there is provided a method of manufacturing an electric double layer capacitor package, the method including: forming a lower case having a plurality of housing spaces provided by one or more partitions and having an internal series-connection terminal buried in each of the partitions; disposing a plurality of capacitor cells in the plurality of housing spaces, respectively, each capacitor cell including first and second electrodes and a separator interposed between the first and second electrodes; connecting the internal series-connection terminal and the plurality of capacitor cells in series; and mounting an upper cap on the lower case so as to cover the housing spaces.

The forming of the lower case may be performed by insert injection molding.

The internal series-connection terminal being buried in a partition providing adjacent first and second housing spaces among the plurality of housing spaces may have first and second internal terminal portions. The internal series-connection terminal may be buried such that the first internal terminal portion may be exposed to the first housing space and the second internal terminal portion may be exposed to the second housing space.

The method may further include forming first and second external terminals in the lower case so as to apply electricity to the capacitor cells.

The method may further include forming first and second external terminals buried in the lower case, each external terminal having a first surface exposed to the housing space and a second surface exposed to an outside of the lower case.

The first and second external terminals may be buried in the lower case by insert injection molding.

The first and second external terminals may be provided on a surface to be defined as a lower surface of the lower case.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
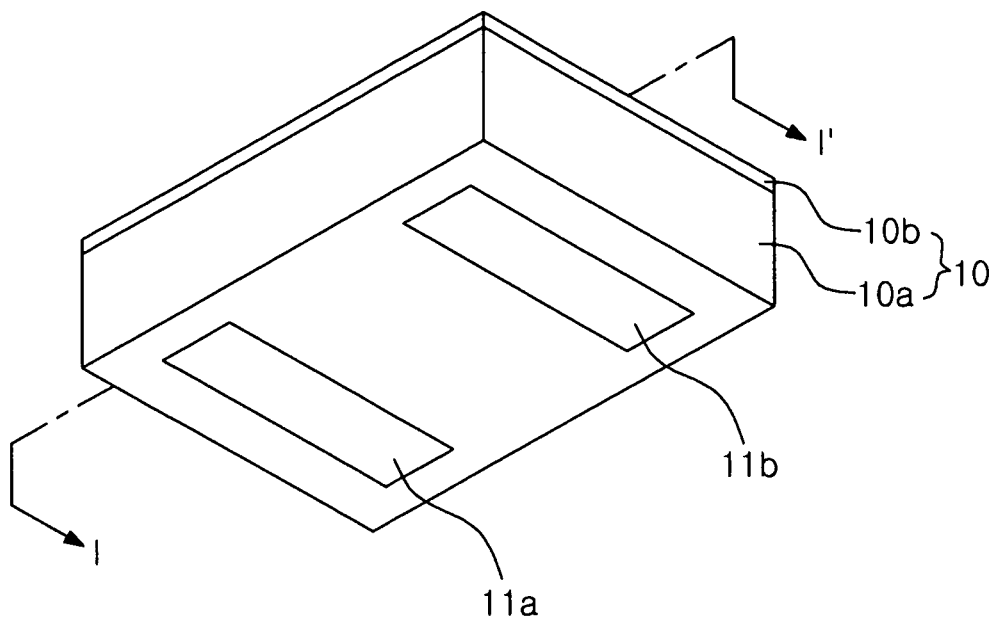
FIG. 1A is a schematic perspective view illustrating an electric double layer capacitor package according to an exemplary embodiment of the present invention.

Exemplary embodiments of the present invention will now be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art. It should be considered that the shapes and dimensions of elements in the drawings may be exaggerated for clarity. Throughout the drawings, the same reference numerals will be used to designate the same or like elements.

Figure 1B:
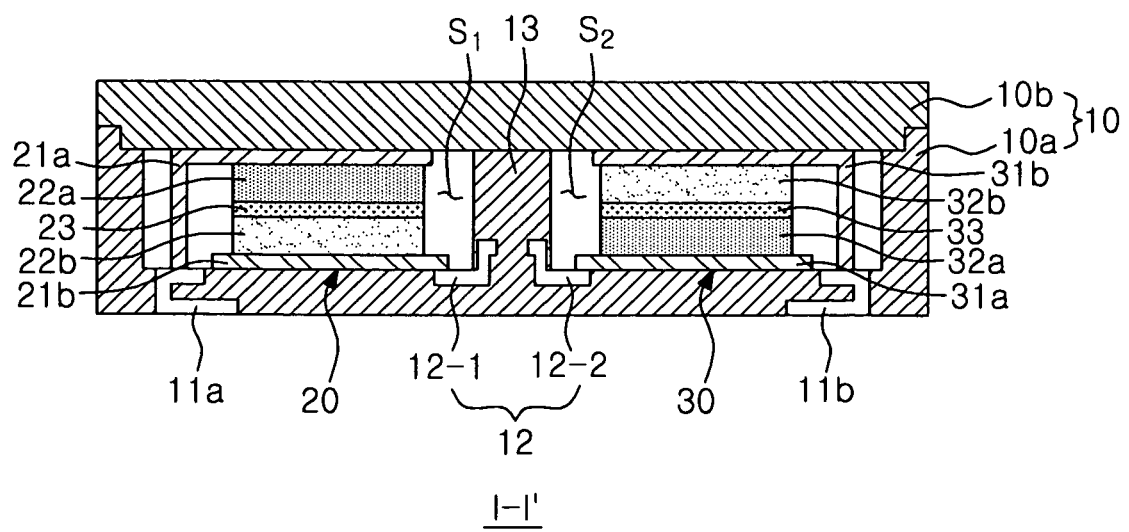
FIG. 1B is a schematic cross-sectional view illustrating the electric double layer capacitor package of FIG. 1A, taken along line I-I'.
Figure 2:
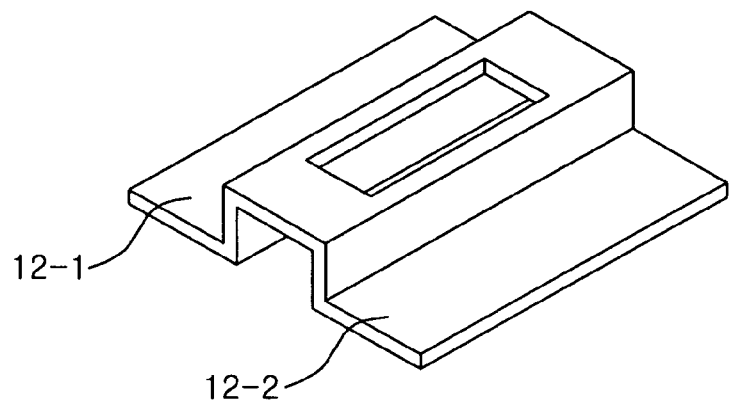
FIG. 2 is a schematic perspective view illustrating an internal series-connection terminal according to an exemplary embodiment of the present invention.
Figure 3:
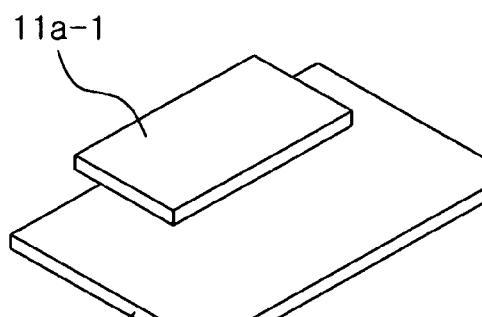
FIG. 3 is a schematic perspective view illustrating first and second external terminals according to an exemplary embodiment of the present invention.
Figure 3:
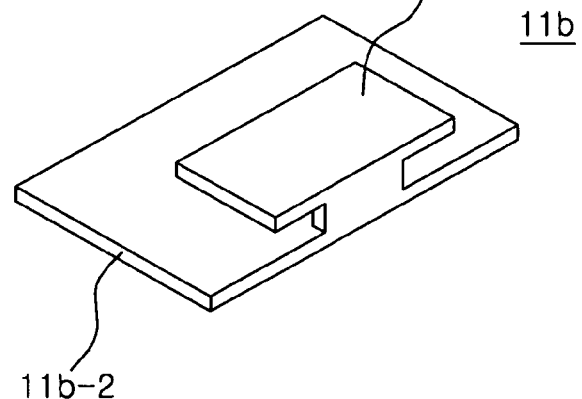
Figure 4:
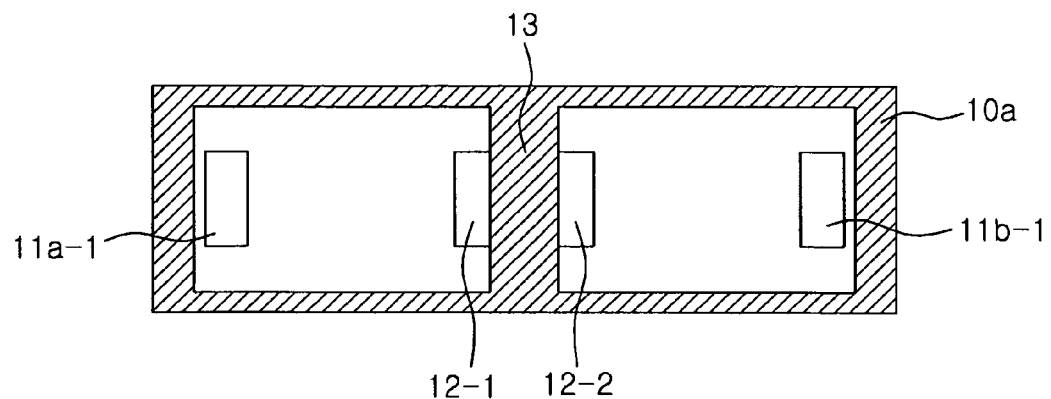
FIG. 4 is a top plan view schematically illustrating a lower case according to an exemplary embodiment of the present invention.

FIG. 1A is a schematic perspective view illustrating an electric double layer capacitor package according to an exemplary embodiment of the present invention. FIG. 1B is a schematic cross-sectional view illustrating the electric double layer capacitor package of FIG. 1A, taken along line I-I'. FIG. 2 is a schematic perspective view illustrating an internal series-connection terminal according to an exemplary embodiment of the present invention. FIG. 3 is a schematic perspective view illustrating first and second external terminals according to an exemplary embodiment of the present invention. FIG. 4 is a top plan view schematically illustrating a lower case according to an exemplary embodiment of the present invention.

With reference to FIGS. 1A and 1B, an electric double layer capacitor package according to this embodiment includes an exterior case 10 having a plurality of housing spaces provided by a partition formed therein, first and second capacitor cells 20 and 30 disposed in the housing spaces, and an internal series-connection terminal 12 connecting the first and second capacitor cells 20 and 30 in series.

The exterior case 10 is formed of insulating resin and has a housing space therein. The exterior case 10 may have at least one partition 13 so as to divide the housing space into a plurality of housing spaces.

The insulating resin is not particularly limited. For example, the insulating resin may be polyphenylene sulfide (PPS) or liquid crystal polymer (LCP). Accordingly, the electric double layer capacitor package may protect its internal structure during a surface mounting process which is performed at a high temperature of about 240° C. to 270° C.

The exterior case 10 may have first and second housing spaces $S_1$ and $S_2$ provided by the partition 13. The first and second housing spaces $S_1$ and $S_2$ may have the first and second capacitor cells 20 and 30 disposed therein, respectively.

The internal series-connection terminal 12 is buried in the partition 13. The internal series-connection terminal 12 may be buried in the partition 13 by insert injection molding.

FIG. 2 is a schematic perspective view illustrating the internal series-connection terminal 12 according to an exemplary embodiment of the present invention.

The internal series-connection terminal 12 has a first internal terminal portion 12-1 exposed to the first housing space $S_1$ and a second internal terminal portion 12-2 exposed to the second housing space $S_2$. The internal series-connection terminal 12 is a structure for connecting the two adjacent housing spaces. The internal series-connection terminal 12 allows the first and second capacitor cells 20 and 30 to be connected in series.

The shape of the internal series-connection terminal 12 is not particularly limited. The internal series-connection terminal 12 may be appropriately modified so as to be easily buried in the partition 13 while ensuring areas for the first and second internal terminal portions 12-1 and 12-2 and having a wide contact area with the insulating resin.

The material of the internal series-connection terminal 12 is not particularly limited as long as it has superior conductivity. For example, the internal series-connection terminal 12 may be formed of a conductive polymer, a rubber sheet, or a metallic foil.

The exterior case 10 may have first and second external terminals 11a and 11b so as to apply electricity to the first and second capacitor cells 20 and 30.

The structures of the first and second external terminals 11a and 11b are not particularly limited as long as the first and second external terminals 11a and 11b are electrically connected to the first and second capacitor cells 20 and 30.

According to the present embodiment, the first and second external terminals 11a and 11b are buried in the exterior case 10. The first and second external terminals 11a and 11b may be buried in the exterior case 10 by insert injection molding.

FIG. 3 is a schematic perspective view illustrating the first and second external terminals 11a and 11b according to an exemplary embodiment of the present invention.

The first external terminal 11a may be formed on a surface of the exterior case 10 providing the first housing space $S_1$ and the second external terminal 11b may be formed on a surface of the exterior case 10 providing the second housing space $S_2$. Also, the first external terminal 11a may have a first surface 11a-1 exposed to the first housing space $S_1$ and a second surface 11a-2 exposed to the outside of the exterior case 10, and the second external terminal 11b may have a first surface 11b-1 exposed to the second housing space $S_2$ and a second surface 11b-2 exposed to the outside of the exterior case 10. The first and second external terminals 11a and 11b are structures for connecting the outside of the exterior case 10 and the housing spaces.

The first and second external terminals 11a and 11b may be used to apply electricity to the first and second capacitor cells 20 and 30. The first surfaces 11a-1 and 11b-1 of the first and second external terminals 11a and 11b may be connected to the first and second capacitor cells 20 and 30, respectively. The second surfaces 11a-2 and 11b-2 of the first and second external terminals 11a and 11b may be connected to an external power source.

The shapes of the first and second external terminals 11a and 11b are not particularly limited. The first and second external terminals 11a and 11b may be appropriately modified so as to be easily buried in the exterior case while ensuring areas for the first and second surfaces and having a wide contact area with insulating resin.

The exterior case 10 according to this embodiment may include a lower case 10a having the housing spaces whose top surfaces are open and an upper cap 10b covering the housing spaces.

The lower case 10a may be formed such that the insulating resin and the first and second external terminals 11a and 11b are integrated by insert injection molding or the like.

FIG. 4 is a top plan view schematically illustrating a lower case according to an exemplary embodiment of the present invention.

The first and second external terminals 11a and 11b may be formed on the same surface of the lower case 10a. The first surfaces 11a-1 and 11b-1 of the first and second external terminals 11a and 11b are exposed to the first and second housing spaces $S_1$ and $S_2$ of the lower case 10a, respectively. The same surface may be defined as a lower surface of the lower case 10a, and the lower surface may be provided as a surface mounting surface.

Also, the internal series-connection terminal 12 is buried in the partition 13 providing the first and second housing spaces $S_1$ and $S_2$ of the lower case 10a, and the first and second internal terminal portions 12-1 and 12-2 of the internal series-connection terminal 12 are exposed to the first and second housing spaces $S_1$ and $S_2$, respectively.

In the present embodiment, the internal series-connection terminal 12 is buried through the lower case 10a and the partition 13, but it is not limited thereto. The internal series-connection terminal 12 may be buried in an appropriate position in a height direction of the partition 13.

The first capacitor cell 20 may be disposed in the first housing space $S_1$ and the second capacitor cell 30 may be disposed in the second housing space $S_2$.

The first capacitor cell 20 may include first and second electrodes 22a and 22b, and a separator 23 interposed between the first and second electrodes 22a and 22b. The second capacitor cell 30 may include first and second electrodes 32a and 32b, and a separator 33 interposed between the first and second electrodes 32a and 32b.

The first and second electrodes 22a and 22b of the first capacitor cell 20 are disposed to face each other and have different polarities. The first and second electrodes 32a and 32b of the second capacitor cell 30 are disposed to face each other and have different polarities.

The first and second electrodes 22a, 22b, 32a and 32b may be formed of a polarizable electrode material. For example, activated carbon with a relatively high specific surface area may be used.

The first electrode 22a of the first capacitor cell 20 may be formed on a first current collector 21a. The second electrode 32b of the second capacitor cell 30 may be formed on a second current collector 31b.

The first and second current collectors 21a and 31b are conductive sheets for transferring an electrical signal to the first and second electrodes 22a and 32b, respectively. The first and second current collectors 21a and 31b may be formed of a conductive polymer, a rubber sheet, or a metallic foil.

In the present embodiment, the first capacitor cell 20 is electrically connected to the first external terminal 11a through the first current collector 21a, and the second capacitor cell 30 is electrically connected to the second external terminal 11b through the second current collector 31b.

The shapes of the first and second current collectors 21a and 31b may be appropriately modified in such a manner that they are electrically connected to the first and second external terminals 11a and 11b, respectively. Such a modification may be influenced by the shape or size of the capacitor cell and the shape and position of the external terminal.

The second electrode 22b of the first capacitor cell 20 and the first electrode 32a of the second capacitor cell 30 are connected in series through the internal series-connection terminal 12.

More specifically, a second current collector 21b of the first capacitor cell 20 is electrically connected to the first internal terminal portion 12-1 of the internal series-connection terminal 12, and a first current collector 31a of the second capacitor cell 30 is electrically connected to the second internal terminal portion 12-2 of the internal series-connection terminal 12.

In a case where the first and second electrodes 22a and 22b are not formed on the first and second current collectors 21a and 21b, the first and second electrode materials may be formed by using a solid-state sheet, and the first electrode 22a may be electrically connected to the first external terminal 11a and the second electrode 22b may be electrically connected to the first internal terminal portion 12-1 of the internal series-connection terminal 12.

Although not shown, each of the first and second capacitor cells 20 and 30 may be a stack in which a plurality of unit cells are stacked, when each unit cell is defined to include a first electrode, a second electrode and a separator.

The first and second separators 23 and 33 may be formed of a porous material through which ions can permeate. For example, a porous material such as polypropylene, polyethylene, or glass fiber may be used. However, the material is not limited thereto.

The second electrode 22b of the first capacitor cell 20 and the first electrode 32a of the second capacitor cell 30 are connected in series through the internal series-connection terminal 12 to thereby form a pair of electrodes. Accordingly, the electric double layer capacitor package according to this embodiment allows for the series connection within a single package, so that an increase in a surge voltage and an operating voltage may be achieved.

Figure 5:
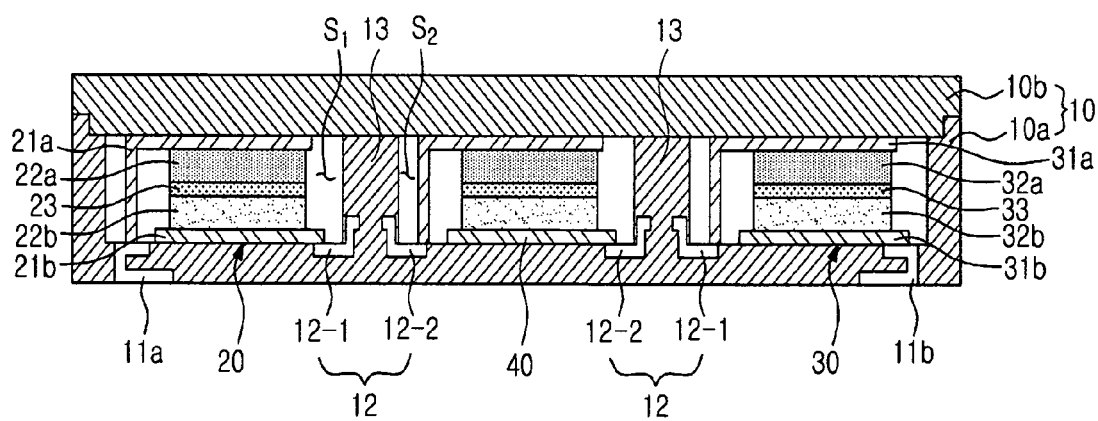
FIG. 5 is a schematic cross-sectional view illustrating an electric double layer capacitor package according to another exemplary embodiment of the present invention.

FIG. 5 is a schematic cross-sectional view illustrating an electric double layer capacitor package according to another exemplary embodiment of the present invention. The following description will be focused on different elements from those of the electric double layer capacitor package according to the above-described embodiment of the present invention, and a detailed description of the same components will be omitted.

An electric double layer capacitor package according to this embodiment includes an exterior case 10 having a plurality of housing spaces provided by partitions formed therein, first to third capacitor cells 20, 30 and 40 disposed in the housing spaces, respectively, and internal series-connection terminals 12 connecting the first to third capacitor cells in series.

In the present embodiment, two internal series-connection terminals 12 are provided. Each internal series-connection terminal 12 is buried in the partition 13 providing adjacent first and second housing spaces $S_1$ and $S_2$. Each internal series-connection terminal 12 has a first internal terminal portion 12-1 exposed to the first housing space $S_1$ and a second internal terminal portion 12-2 exposed to the second housing space $S_2$.

In the present embodiment, three housing spaces are provided by two partitions 13. The first, second and third capacitor cells 20, 30 and 40 are disposed in the three housing spaces, respectively.

The capacitor cells are connected in series by the internal series-connection terminals 12 buried in the partitions 13. More specifically, the first capacitor cell 20 is serially connected to the third capacitor cell 40, and the third capacitor cell 40 is serially connected to the second capacitor cell 30.

In order to receive electricity from an external power source, the first capacitor cell 20 is electrically connected to the first external terminal 11a and the second capacitor cell 30 is electrically connected to the second external terminal 11b.

The electric double layer capacitor package according to this embodiment allows for the series connection of three capacitor cells within a single package, so that an increase in a surge voltage and an operating voltage may be achieved.

Figure 6A:
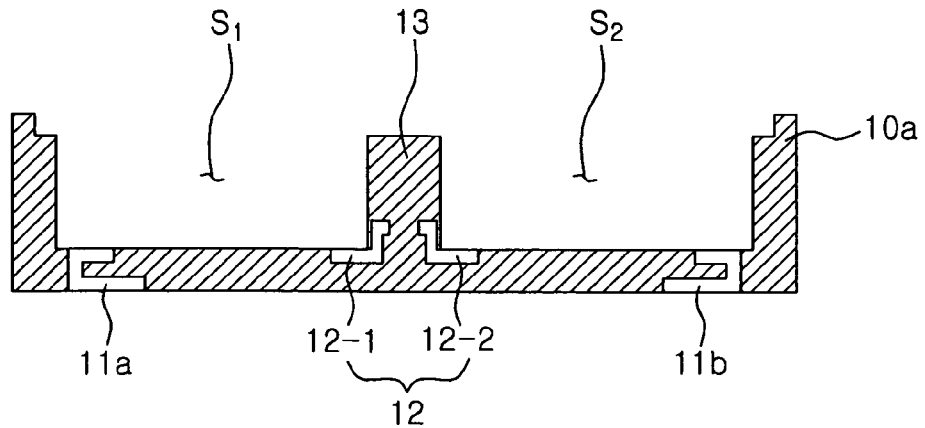
FIGS. 6A through 6C are cross-sectional views illustrating a method of manufacturing an electric double layer capacitor package according to an exemplary embodiment of the present invention.
Figure 6B:
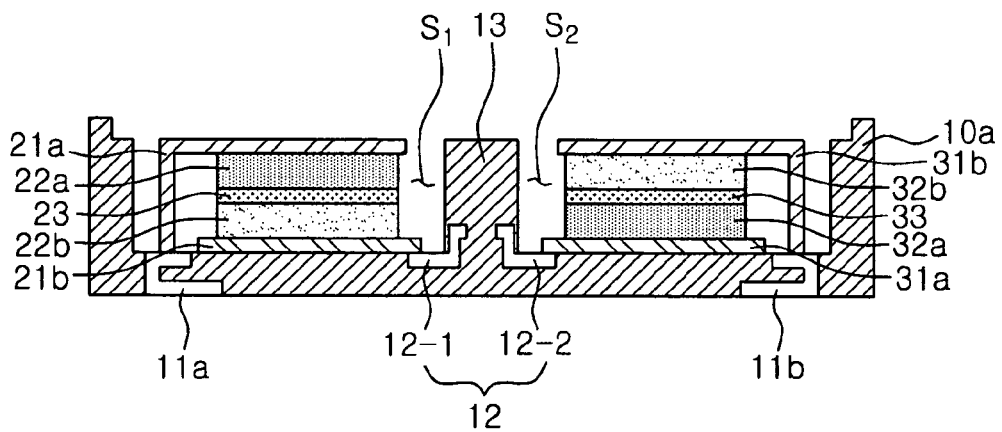
Figure 6C:
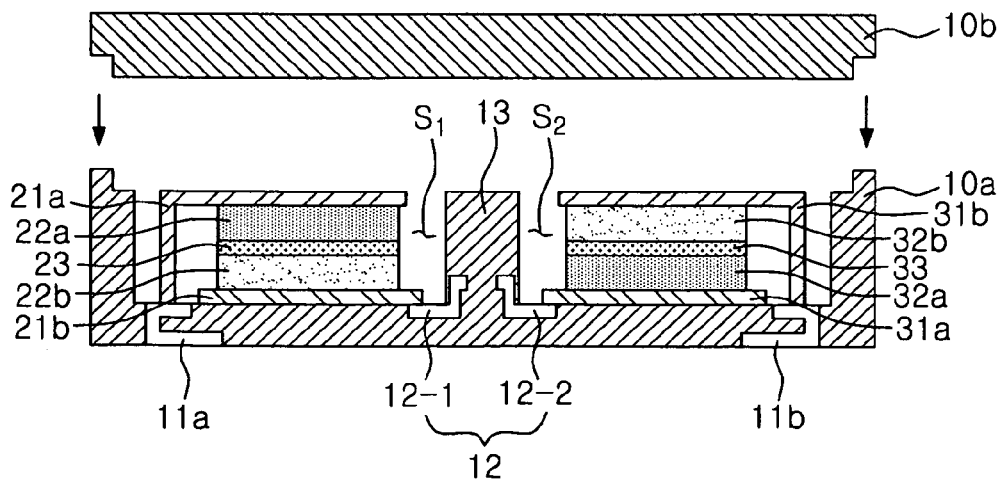

FIGS. 6A through 6C are cross-sectional views illustrating a method of manufacturing an electric double layer capacitor package according to an exemplary embodiment of the present invention.

First, as shown in FIG. 6A, the lower case 10a is formed of insulating resin and has the first and second housing spaces $S_1$ and $S_2$ that are provided by the partition 13. Also, the lower case 10a may be formed in order that the partition 13 has the internal series-connection terminal 12 buried therein. The partition 13 may form a portion of the lower case 10a and may be formed of the same insulating resin as that of the lower case 10a.

As shown in FIG. 2, the internal series-connection terminal 12 may have the first and second internal terminal portions 12-1 and 12-2. The internal series-connection terminal 12 may be buried in a manner such that the first internal terminal portion 12-1 is exposed to the first housing space $S_1$ and the second internal terminal portion 12-2 is exposed to the second housing space $S_2$.

The method of forming the lower case 10a is not particularly limited. For example, insert injection molding may be applied.

More specifically, the internal series-connection terminal 12 is disposed in a mold having a desired lower-case and partition shape, and the insulating resin is injected into the mold. The insulating resin injected into the mold hardens with the internal series-connection terminal 12 in the mold through cooling or cross-linking. The insulating resin and the internal series-connection terminal 12 may be integrated by insert injection molding, even though the internal series-connection terminal 12 is formed of a different material from the insulating resin.

Also, the lower case 10a may have the first and second external terminals 11a and 11b buried therein so as to apply electricity to the capacitor cells. In the present embodiment, the first and second external terminals 11a and 11b of FIG. 3 are formed in the lower case 10a.

The first and second external terminals 11a and 11b may be buried in the lower case 10a in a manner such that the first external terminal 11a may have the first surface 11a-1 exposed to the first housing space $S_1$ and the second surface 11a-2 exposed to the outside of the lower case 10a, and the second external terminal 11b may have the first surface 11b-1 exposed to the second housing space $S_2$ and the second surface 11b-2 exposed to the outside of the lower case 10a. The method of burying the first and second external terminals 11a and 11b in the lower case 10a is not particularly limited. For example, insert injection molding may be applied as described above.

As shown in FIG. 6A, the first and second external terminals 11a and 11b may be formed on a surface to be defined as a lower surface of the lower case 10a, and the lower surface may be provided as a surface mounting surface.

Also, besides the method of burying the first and second external terminals in the lower case, the external terminals may be provided in various manners so as to apply electricity to the capacitor cells.

Next, as shown in FIG. 6B, the first and second capacitor cells 20 and 30 are disposed in the first and second housing spaces $S_1$ and $S_2$ of the lower case 10a, respectively.

The first capacitor cell 20 may be prepared by providing the first and second electrodes 22a and 22b with the separator 23 interposed therebetween. The second capacitor cell 30 may be prepared by providing the first and second electrodes 32a and 32b with the separator 33 interposed therebetween.

Also, the first and second electrodes 22a and 22b of the first capacitor cell 20 may be formed on the first and second current collectors 21a and 21b, respectively. The first and second electrodes 32a and 32b of the second capacitor cell 30 may be formed on the first and second current collectors 31a and 31b, respectively.

The first and second capacitor cells 20 and 30 are disposed to be electrically connected to the internal series-connection terminal 12. More specifically, the second current collector 21b of the first capacitor cell 20 may be electrically connected to the first internal terminal portion 12-1 of the internal series-connection terminal 12, and the first current collector 31a of the second capacitor cell 30 may be electrically connected to the second internal terminal portion 12-2 of the internal series-connection terminal 12.

The shapes of the first and second current collectors 31a and 21b may be appropriately modified so as to make electrical connections with the internal series-connection terminal 12.

Although not shown, in a case where the first and second electrodes are not formed on the first and second current collectors, the first and second electrode materials may be formed by using a solid-state sheet, and the first and second electrodes may be electrically connected to the internal series-connection terminal.

Also, the first current collector 21a of the first capacitor cell 20 may be electrically connected to the first external terminal 11a, and the second current collector 31b of the second capacitor cell 30 may be electrically connected to the second external terminal 11b.

Then, as shown in FIG. 6C, the first and second housing spaces $S_1$ and $S_2$ of the lower case 10a are filled with an electrolyte. Here, an aqueous electrolyte or non-aqueous electrolyte may be used. Thereafter, the upper cap 10b is mounted on the lower case 10a so as to cover the first and second housing spaces $S_1$ and $S_2$.

The electric double layer capacitor package according to this embodiment allows for the series connection of a plurality of capacitor cells within a single package, so that an increase in a surge voltage and an operating voltage may be achieved.

As set forth above, according to exemplary embodiments of the invention, an electric double layer capacitor package allows for the series connection of capacitor cells within a single package, and thus its surge voltage and operating voltage can be increased.

In addition, an electric double layer capacitor package according to exemplary embodiments of the invention has an exterior case and an external terminal formed integrally so that it may have high space utilization. Furthermore, the electric double layer capacitor package itself may be surface-mounted without any additional structure.

While the present invention has been shown and described in connection with the exemplary embodiments, it will be apparent to those skilled in the art that modifications and variations can be made without departing from the spirit and scope of the invention as defined by the appended claims.

What is claimed is:

1. An electric double layer capacitor package comprising:
    an exterior case formed of insulating resin and having therein one or more partitions providing a plurality of housing spaces;
    a plurality of capacitor cells disposed in the plurality of housing spaces, respectively, each capacitor cell including first and second electrodes and a separator interposed between the first and second electrodes; and
    an internal series-connection terminal buried in each of the partitions and connecting the plurality of capacitor cells in series.

2. The electric double layer capacitor package of claim 1, wherein the internal series-connection terminal is buried in each of the partitions by insert injection molding.

3. The electric double layer capacitor package of claim 1, wherein the internal series-connection terminal is buried in a partition providing adjacent first and second housing spaces among the plurality of housing spaces, and
    the internal series-connection terminal has a first internal terminal portion exposed to the first housing space and a second internal terminal portion exposed to the second housing space.

4. The electric double layer capacitor package of claim 1, wherein the exterior case has first and second external terminals so as to apply electricity to the capacitor cells.

5. The electric double layer capacitor package of claim 4, wherein the first and second external terminals are provided on a surface to be defined as a lower surface of the exterior case.

6. The electric double layer capacitor package of claim 1, wherein the first and second external terminals are buried in the exterior case, each external terminal having a first surface exposed to the housing space and a second surface exposed to an outside of the exterior case.

7. The electric double layer capacitor package of claim 6, wherein the first and second external terminals are buried in the exterior case by insert injection molding.

8. The electric double layer capacitor package of claim 6, wherein the first and second external terminals are provided on a surface to be defined as a lower surface of the exterior case.

9. The electric double layer capacitor package of claim 1, wherein a first electrode of a first capacitor cell among the plurality of capacitor cells is electrically connected to the first external terminal connected to an external power source,
    a second electrode of a second capacitor cell among the plurality of capacitor cells is electrically connected to the second external terminal connected to an external power source, and
    a second electrode of the first capacitor cell and a first electrode of the second capacitor cell are connected in series by the internal series-connection terminal.

10. The electric double layer capacitor package of claim 1, wherein the capacitor cell includes first and second current collectors electrically connected to the first and second electrodes.

11. The electric double layer capacitor package of claim 1, wherein the exterior case comprises:
    a lower case having the one or more partitions providing the plurality of housing spaces whose top surfaces are open; and
    an upper cap mounted on the lower case so as to cover the housing spaces.

12. A method of manufacturing an electric double layer capacitor package, the method comprising:
    forming a lower case having a plurality of housing spaces provided by one or more partitions and having an internal series-connection terminal buried in each of the partitions;
    disposing a plurality of capacitor cells in the plurality of housing spaces, respectively, each capacitor cell including first and second electrodes and a separator interposed between the first and second electrodes;
    connecting the internal series-connection terminal and the plurality of capacitor cells in series; and
    mounting an upper cap on the lower case so as to cover the housing spaces.

13. The method of claim 12, wherein the forming of the lower case is performed by insert injection molding.

14. The method of claim 12, wherein the internal series-connection terminal being buried in a partition providing adjacent first and second housing spaces among the plurality of housing spaces has first and second internal terminal portions, and
    the internal series-connection terminal is buried such that the first internal terminal portion is exposed to the first housing space and the second internal terminal portion is exposed to the second housing space.

15. The method of claim 12, further comprising forming first and second external terminals in the lower case so as to apply electricity to the capacitor cells.

16. The method of claim 15, wherein the first and second external terminals are provided on a surface to be defined as a lower surface of the lower case.

17. The method of claim 12, further comprising forming first and second external terminals buried in the lower case, each external terminal having a first surface exposed to the housing space and a second surface exposed to an outside of the lower case.

18. The method of claim 17, wherein the first and second external terminals are buried in the lower case by insert injection molding.

19. The method of claim 17, wherein the first and second external terminals are provided on a surface to be defined as a lower surface of the lower case.

* * * * *